United States Patent
Corsaro

(10) Patent No.: US 10,975,276 B2
(45) Date of Patent: Apr. 13, 2021

(54) AQUEOUS ADHESIVE COMPOSITION BASED ON EPOXY RESIN WITH IMPROVED ADHESION AND STORAGE STABILITY

(71) Applicant: SIKA TECHNOLOGY AG, Baar (CH)

(72) Inventor: Antonio Corsaro, Regensdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 314 days.

(21) Appl. No.: 15/746,174

(22) PCT Filed: Aug. 19, 2016

(86) PCT No.: PCT/EP2016/069710
§ 371 (c)(1),
(2) Date: Jan. 19, 2018

(87) PCT Pub. No.: WO2017/032714
PCT Pub. Date: Mar. 2, 2017

(65) Prior Publication Data
US 2018/0215968 A1   Aug. 2, 2018

(30) Foreign Application Priority Data
Aug. 21, 2015 (EP) .................... 15182033

(51) Int. Cl.
| | | |
|---|---|---|
| *C09J 163/00* | (2006.01) | |
| *C09D 163/00* | (2006.01) | |
| *C08G 59/50* | (2006.01) | |
| *B05D 5/10* | (2006.01) | |
| *C08G 59/56* | (2006.01) | |
| *C09D 5/00* | (2006.01) | |
| *C09J 5/02* | (2006.01) | |

(52) U.S. Cl.
CPC .............. *C09J 163/00* (2013.01); *B05D 5/10* (2013.01); *C08G 59/50* (2013.01); *C08G 59/504* (2013.01); *C08G 59/56* (2013.01); *C09D 5/002* (2013.01); *C09D 163/00* (2013.01); *C09J 5/02* (2013.01); *C09J 2463/003* (2013.01)

(58) Field of Classification Search
CPC ........ B05D 5/10; C08G 59/50; C08G 59/504; C08G 59/56; C09D 5/002; C09D 163/00; C09J 5/02; C09J 163/00; C09J 2463/003
USPC ....................................................... 523/400
See application file for complete search history.

(56) References Cited

U.S. PATENT DOCUMENTS

| | | | |
|---|---|---|---|
| 5,363,994 A | 11/1994 | Angeline | |
| 2011/0027591 A1* | 2/2011 | Braun | C08G 59/50 428/414 |
| 2012/0270967 A1* | 10/2012 | Burckhardt | C08G 59/4042 523/400 |

FOREIGN PATENT DOCUMENTS

| | | |
|---|---|---|
| EP | 0567831 A1 | 11/1993 |
| EP | 2336213 A1 | 6/2011 |
| JP | 2003-239081 A | 8/2003 |
| JP | 2006342419 A * | 12/2006 |
| WO | 2008/037780 A2 | 4/2008 |

OTHER PUBLICATIONS

Miyoshi et al., machine translation of JP-2006342419-A, Dec. 21, 2006 (Year: 2006).*
Mar. 10, 2020 Office Action issued in Brazilian Patent Application No. BR112018002184-9.
Sep. 15, 2016 International Search Report issued in International Patent Application No. PCT/EP2016/069710.
Database WPI, Week 200429; Thomson Scientific, London, GB; AN 2004-307595, XP002752898, & JP 2003 239081 A (Kawasaki Steel Corp); Aug. 27, 2003, abstract.

* cited by examiner

Primary Examiner — David T Karst
(74) Attorney, Agent, or Firm — Oliff PLC

(57) ABSTRACT

An aqueous adhesion composition comprising: a) at least one dispersed solid epoxy resin (EP); b) at least one amino silane (AS); c) at least one acid (HS); d) at least one amine hardener (AH); and e) water. According to the invention, the adhesion compositions substantially improve, particularly under humid conditions, the adhesion on different substrates. The compositions are storage stable for a longer period of time and have, even after different aging states of the components, essentially no impairment in the action thereof.

14 Claims, No Drawings

AQUEOUS ADHESIVE COMPOSITION BASED ON EPOXY RESIN WITH IMPROVED ADHESION AND STORAGE STABILITY

TECHNICAL FIELD

The invention pertains to the field of adhesion promoter compositions and to use thereof as primers for adhesives and sealants.

PRIOR ART

Adhesion promoter compositions have already been used for some considerable time to improve the adhesion of adhesives and sealants on various substrates. The use of such adhesion promoters is widespread in the automobile industry, for example, where requirements imposed on the quality of the adhesion are particularly high and where some of the substrates that need bonding are demanding.

Adhesion promoter compositions of this kind often include reactive constituents such as organosilanes, which react with one another and with the bond substrates and form a suitable interlayer for the adhesive. The compositions are typically solutions or dispersions which are applied in liquid form before the solvent evaporates. Solvents employed are usually volatile organic compounds (VOC) which, however, pose a disadvantage for reasons of environmental, health and workplace safety. Attempts have therefore been made to replace solvent-containing adhesion promoter compositions by aqueous ones. A problem often observed with aqueous adhesion promoter compositions based on silane, particularly if they are formulated as one-component compositions, however, is either their relatively low storage stability for adequate reactivity, or their inadequate reactivity for sufficient storage stability. Moreover, aqueous adhesion promoter compositions tend to lose their adhesion in the bonded assembly again under hot and humid conditions, as for example when stored under conditions of heat and humidity. One aqueous adhesion promoter composition having comparatively good integrity under hot and humid conditions is described in WO 2008/037780, for example. It represents a two-component system consisting of an epoxy resin dispersion and an amine hardener. On relatively long storage under conditions of heat and humidity, however, even this adhesion promoter composition displays loss of adhesion.

There consequently continues to be a need for an aqueous adhesion promoter composition which permits an adhesive bond which is stable over long periods, even under demanding, hot and humid conditions, and possesses excellent storage stability, both in two-component and in one-component formulations.

SUMMARY OF THE INVENTION

It is an object of the present invention, therefore, to provide an adhesion promoter composition with insubstantial emission of volatile organic compounds, or no such emission, which can be formulated as a one-component or two-component composition, and which, in either case, possesses very good storage stability and at the same time, even after a relatively long time post application, does not lead to a loss of adhesion under hot and humid conditions.

This object is achieved by an adhesion promoter composition of the invention as claimed in claim 1.

Surprisingly it has been found that the use of acids as additives in the adhesion promoter composition substantially increases its storage stability and, especially in conjunction with inorganic bases in two-component formulations or as water-soluble carboxylic acids in one-component formulations, significantly enhances its integrity under hot and humid conditions.

Further aspects of the invention are a subject of further independent claims. Particularly preferred embodiments of the invention are subject matter of the dependent claims.

CERTAIN EMBODIMENTS OF THE INVENTION

The present invention relates to an aqueous adhesion promoter composition comprising
a) at least one dispersed solid epoxy resin EP;
b) at least one aminosilane AS;
c) at least one acid HS;
d) at least one amine hardener AH; and
e) water.

Substance names beginning with "poly", such as polyamine or polyisocyanate, refer in the present document to substances which formally contain two or more per molecule of the functional groups that occur in their names.

Accordingly, the present document understands "polyamine" to comprise compounds which have two or more amino groups.

The term "polymer" in the present document encompasses on the one hand a collective of chemically uniform macromolecules which nevertheless differ in terms of degree of polymerization, molar mass, and chain length, said macromolecules having been prepared by a polymerization reaction (chain growth addition polymerization, polyaddition, polycondensation). The term on the other hand also encompasses derivatives of such a collective of macromolecules from polymerization reactions, in other words compounds which have been obtained from specified macromolecules by reactions—such as additions or substitutions, for example—of functional groups, and which may be chemically uniform or chemically disparate. The term, furthermore, also encompasses what are called prepolymers, in other words reactive oligomeric preadducts whose functional groups have participated in the construction of macromolecules.

"Storage under conditions of heat and humidity" refers here to the storage of a sample at a temperature of 70° C. and a relative atmospheric humidity of 100%. "Molecular weight" is understood in the present document to be the molar mass (in grams per mole) of a molecule. "Average molecular weight" is the number-average molecular weight $M_n$ of an oligomeric or polymeric mixture of molecules, and is typically determined by GPC (gel permeation chromatography) against a polystyrene standard.

"Weight percent", abbreviated to "wt %", is used by the present document to refer to a mass fraction in percent by mass of a constituent in relation to an overall composition. "Weight" is understood as the physical mass, measurable for example in grams or kilograms.

In one particularly preferred embodiment of the adhesion promoter composition of the invention, the composition is an at least two-component adhesion promoter composition comprising
a first component KA, comprising
a) the at least one dispersed solid epoxy resin EP;
b) the at least one aminosilane AS;
c) the at least one acid HS; and
d) water; and a second component KB comprising
a) the at least one amine hardener AH;
b) additionally at least one inorganic base BA; and
c) water.

This embodiment has the advantages of particularly high storage stability, as a result of the components being kept separate, and of particularly high integrity of the bond under hot and humid conditions.

A second particularly preferred embodiment of the adhesion promoter composition of the invention is a one-component adhesion promoter composition which consists of a single component KAB, where the acid HS comprises at least one water-soluble carboxylic acid CHS and preferably consists of at least one water-soluble carboxylic acid CHS.

This embodiment has the advantages of particularly easy handling and user friendliness, and improved storage stability as a result of the use of a water-soluble carboxylic acid CHS, and also increased integrity of the bond under hot and humid conditions.

The dispersed solid epoxy resin EP is more particularly an aqueous dispersion of a solid epoxy resin EP of formula (I).

Such an aqueous dispersion of at least one solid epoxy resin EP optionally comprises further constituents, such as, for example, liquid epoxy resins, stabilizers, emulsifiers, coemulsifiers, defoamers, biocides, pigments, fillers, reactive diluents or catalysts. The aqueous dispersion is preferably stable over a period of several months up to a year or more without forming multiple phases or sediments which cannot be reconverted into a macroscopically homogeneous dispersion by shaking or stirring.

An aqueous dispersion of at least one solid epoxy resin EP that is suitable for the present invention preferably has a solids content of solid epoxy resin EP of 30 to 80%, more particularly 45 to 65%, very preferably 50 to 60%. Accordingly, the aqueous dispersion of at least one solid epoxy resin contains in particular about 20 to 70% of water.

The average size of the dispersed particles of solid epoxy resin EP in the dispersion is situated in particular in the range from 0.05 to 20 μm, more particularly 0.1 to 10 μm, very preferably 0.2 to 5 μm.

Suitable aqueous dispersions of a solid epoxy resin EP are available commercially, for example, under the trade name

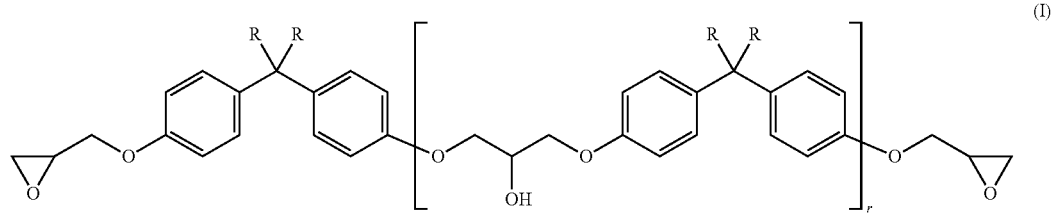

(I)

In this formula, the substituents R independently of one another are either a hydrogen atom or a methyl group. Moreover, the index r is a value of >1, more particularly of 1.5. Preferably r is a value from 2 to 12.

A solid epoxy resin typically has a glass transition temperature which lies above the room temperature of around 23° C. Solid epoxy resins can therefore be comminuted at room temperature into pourable powders.

Solid epoxy resins of this kind are available commercially as such or already in aqueously dispersed form, for example, from Dow Chemical Company, USA, from Huntsman International LLC, USA, or from Hexion Specialty Chemicals Inc., USA.

Additionally suitable for example are solid epoxy resins which at least partly have N-glycidyl groups rather than glycidyl ether groups, and also epoxy resins based on aliphatic glycidyl ethers.

Likewise suitable are solid epoxy resins from the group of the phenolic resins, especially phenol novolacs or cresol novolacs.

For the present invention it is essential that the solid epoxy resin EP is dispersible in water. It is advantageous to use a solid epoxy resin EP already dispersed in water by suitable methods as raw material for the adhesion promoter composition. Aqueous dispersions of this kind are available commercially, but they may also be self-prepared by suitable methods. With that in mind, the method should be selected such that the resulting dispersion after each production batch is substantially identical or at least so similar, in terms of properties such as solids content or size of the dispersed particles, for example, that the properties of the adhesion promoter composition produced from the dispersion are unaffected.

Waterpoxy® 1422 from Cognis or under the trade name Ancarez™ AR555 Waterborne Epoxy Resin from Air Products. These dispersions may be used without modification of the present invention.

The fraction in the adhesion promoter composition of the invention of the aqueous dispersion having a solids content of 50 to 60% of at least one solid epoxy resin EP, used with particular preference, is preferably 35 to 50 wt %, more particularly 40 to 45 wt % of the aqueous dispersion, based on the overall adhesion promoter composition, or preferably 75 to 95 wt %, more particularly 80 to 90 wt %, based on component KA of an at least two-component adhesion promoter composition.

The adhesion promoter composition of the invention further comprises at least one aminosilane AS.

This at least one aminosilane AS is preferably included either in the component KA together with the acid HS, or in the component KAB together with the water-soluble carboxylic acid CHS.

In preferred embodiments, the composition of the invention comprises further organosilanes, examples being mercaptosilanes, which are able to further improve the adhesion to particular substrates. These further organosilanes, if present, are used preferably together with the at least one aminosilane AS in the composition.

In the present document, the terms "silane" and "organosilane" identify compounds which firstly have at least one, customarily two or three, hydrolyzable groups, preferably alkoxy groups or acyloxy groups bonded directly to the silicon atom, preferably via Si—O bonds, and secondly have at least one organic radical bonded directly to the silicon atom via an Si—C bond. Silanes of these kinds having alkoxy or acyloxy groups are also known by the person skilled in the art as organoalkoxysilanes and organoacyloxysilanes, respectively.

A property of such silanes is that of undergoing at least partial hydrolysis on contact with moisture. This hydrolysis produces organosilanols, these being organosilicon compounds containing one or more silanol groups (Si—OH groups), and subsequent condensation reactions produce organosiloxanes, these being organosilicon compounds containing one or more siloxane groups (Si—O—Si groups).

"Aminosilanes" and "mercaptosilanes" are terms used for organosilanes whose organic radical has an amino group or a mercapto group, respectively. "Primary aminosilanes" are aminosilanes which have a primary amino group, i.e., an $NH_2$ group bonded to an organic radical. "Secondary amino silanes" are aminosilanes which have a secondary amino group, i.e., an NH group bonded to two organic radicals.

The expression "independently of one another" here always means independently of one another in the same molecule if there are various possibilities.

Especially suitable aminosilanes AS are aminosilanes selected from the group consisting of 3-aminopropyltrimethoxysilane, 3-aminopropyldimethoxy-methylsilane, 3-amino-2-methylpropyltrimethoxysilane, 4-aminobutyltrimethoxysilane, 4-aminobutyldimethoxymethylsilane, 4-amino-3-methylbutyltrimethoxy-silane, 4-amino-3,3-dimethylbutyltrimethoxysilane, 4-amino-3,3-dimethylbutyl-dimethoxymethylsilane, 2-aminoethyltrimethoxysilane, 2-aminoethyldimethoxy-methylsilane, aminomethyltrimethoxysilane, aminomethyldimethoxymethylsilane, aminomethylmethoxydimethylsilane, N-methyl-3-aminopropyltrimethoxysilane, N-ethyl-3-aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyl-dimethoxymethylsilane, N-phenyl-4-aminobutyltrimethoxysilane, N-phenyl-aminomethyldimethoxymethylsilane, N-cyclohexylaminomethyldimethoxy-methylsilane, N-methylaminomethyldimethoxymethylsilane, N-ethylamino-methyldimethoxymethylsilane, N-propylaminomethyldimethoxymethylsilane, N-butylaminomethyldimethoxymethylsilane; N-(2-aminoethyl)-3-aminopropyltrimethoxysilane, 3-[2-(2-aminoethylamino)ethylamino]propyltrimethoxysilane, bis(trimethoxysilylpropyl)amine, and also analogs thereof having three ethoxy or three isopropoxy groups instead of the three methoxy groups on the silicon. It is possible and advantageous to use mixtures of such aminosilanes as aminosilane AS. Having proven particularly advantageous, for example, is the mixture of 3-aminopropyltrimethoxysilane, N-(2-aminoethyl)-3-aminopropyltrimethoxysilane and bis(t-rimethoxysilylpropyl)amine.

Aminosilane AS, used preferably as a mixture of different aminosilanes, is included preferably in the adhesion promoter composition of the invention with a content of 0.1 to 10 wt %, preferably 0.25 to 5 wt %, more preferably 0.5 to 2 wt %, based on the overall adhesion promoter composition.

Particularly preferred mercaptosilanes, present possibly, are 3-mercaptopropyltrimethoxysilane and 3-mercaptopropyltriethoxysilane, most preferably 3-mercaptopropyltrimethoxysilane. They are present preferably with a content of 0.1 to 0.2 wt %, based on the overall adhesion promoter composition.

The composition of the invention further comprises at least one acid HS.

The acid HS, if used in an at least two-component composition comprising a component KA and a component KB, is employed together with the aminosilane AS in the component KA. The advantage of this combination is a substantially increased storage stability of component KA of the aqueous two- or multi-component composition comprising aminosilane AS.

Suitability as acid HS is possessed in principle by all acids which in an aqueous solution, emulsion or dispersion are able to protonate the primary and/or secondary amino groups of aminosilanes AS. Examples of suitable acids HS are inorganic acids such as nitric acid, phosphoric acid, phosphorous acid, phosphonic acid, phosphonous acid, sulfuric acid, sulfurous acid, persulfuric acid, disulfuric acid (=pyrosulfuric acid), disulfurous acid, dithionic acid, dithionous acid, thiosulfuric acid or thiosulfurous acid, or organic acids such as water-soluble carboxylic acids CHS, which are described later on below.

Preferred acids HS are sulfuric acid, phosphoric acid, and water-soluble carboxylic acids CHS. With particular preference the acids are used at sufficiently high dilution that they pose no risk to the occupational safety of the user and represent no danger to the environment. This is especially true of corrosive acids also.

The acid HS and/or the water-soluble carboxylic acid CHS are/is preferably included in the adhesion promoter composition of the invention with a content of 0.1 to 5 wt %, preferably 0.25 to 2.5 wt %, based on the overall adhesion promoter composition, or with a content of 0.2 to 10 wt %, preferably 0.5 to 5 wt %, based on the component KA of a two-component adhesion promoter composition.

The adhesion promoter composition of the invention further comprises at least one amine hardener AH.

Amine hardeners in the sense of the present invention are liquid or solid polyamines which possess primary and/or secondary amino groups and which are able to react with the epoxy groups of the dispersed solid epoxy resin EP.

The chemical and physical natures of amine hardeners AH are preferably such that by themselves or through use of suitable adjuvants such as wetting or dispersing agents, they can be dissolved, emulsified or dispersed in water and in that form are stable for sufficiently long.

Suitable amine hardeners AH are described for example in European patent application EP09178262.3.

The amine hardener AH is preferably a reaction product, more particularly a polyamidoamine or an epoxy resin/polyamine addition product, the addition product having an excess of amino groups in comparison to epoxy groups. The amine hardener AH is preferably a polyamidoamine. Examples thereof are condensation products of carboxylic acids with polyamines, such as of a fatty acid or a polycarboxylic acid with a polyalkylenamine, for example. Particularly suitable amine hardeners AH are addition products of epoxy resins and polyamines. Addition products of this kind may be obtained, for example, from a multiplicity of possible epoxy resins and polyamines known to the person skilled in the art, especially bisphenyl A diglycidyl ether. Polyamines preferred for this purpose are ethylenediamine, isophoronediamine, 2,2,4- and 2,4,4-trimethylhexamethylenediamine, 1,3-xylylenediamine, polyalkylenamines such as polyethylenamines or polyoxyalkylenediamines or -triamines, more particularly of the kind available under the trade name Jeffamine® from Huntsman. The reaction product is preferably that of a diglycidyl ether of bisphenol A and/or bisphenol F with a polyoxyalkylenediamine or polyoxyalkylenetriamine. One particularly suitable addition product is that described in EP 0567831 as bis(diamine)-diepoxide adduct.

It is entirely possible, and may even be advantageous, to use a mixture of different amine hardeners AH in the adhesion promoter composition of the invention. Mixtures of polyamines with compounds containing mercapto groups may optionally also be used.

It is advantageous to set the amounts of EP and AH in the composition of the invention in such a way that the ratio of the epoxide equivalents in the dispersion of the solid epoxy resin EP to the equivalents of an active amine hydrogen in the amine hardener AH is between 1:1 and 20:1. This means that an excess of epoxide equivalents is advantageous. A ratio of epoxide equivalents to amine equivalents of between 1:1 and 4:1 is preferred.

The fraction of the amine hardener AH is selected in particular such that in the adhesion promoter composition the ratio of amino groups of amine hardener AH to epoxide groups of the aqueous dispersion of the solid epoxy resin EP that comes about is in the range from 0.1:1 to 1:1.

The fraction of the amine hardener AH is preferably 0.5 to 30 wt %, more particularly 1 to 20 wt %, very preferably 2.5 to 15 wt %, based on the overall adhesion promoter composition, or 1 to 60 wt %, more particularly 2 to 40 wt %, very preferably 3 to 20 wt %, based on the component KB of an at least two-component adhesion promoter composition.

In preferred embodiments, the adhesion promoter composition comprises the amine hardener AH in the form of a pre-prepared aqueous solution, aqueous emulsion or aqueous dispersion, with the aqueous solution, emulsion or dispersion having a solids content of amine hardener AH of 30 to 90%, preferably 50 to 90%, more preferably 75 to 85%, based on the overall aqueous solution, aqueous emulsion or aqueous dispersion of amine hardener AH.

The solids content here is the effective amount of amine hardener in the aqueous emulsion, solution or dispersion, and in the pure state the amine hardener may also be liquid.

Suitable amine hardeners AH which can be used in aqueous compositions of the present invention and which in part are already commercialized in the form of an aqueous preparation are, for example, Anquamine® 731, Anquamine® 735, and Anquawhite® 100, all from Air Products, or Beckopox® EH 623W from Allnex.

In the case of a two- or multicomponent composition, the composition of the invention preferably comprises at least one inorganic base BA, which is used in component KB together with the amine hardener AH. The advantage of using at least one inorganic base BA is that the acid HS in component KA is at least partially neutralized when the two components KA and KB are combined, with the effects both of improving the adhesion effect of the mixed composition and of accelerating the reaction of the organosilanes with one another and/or with the substrates. Accordingly, a significantly improved stability of the adhesion under hot and humid conditions is achieved.

Inorganic bases BA in the sense of the present invention are largely water-soluble compounds of metals and oxides and/or hydroxides which, when dissolved in pure water, increase the pH to above 7. Preferred inorganic bases BA are oxides or hydroxides of alkali metals or alkaline earth metals, the oxides undergoing reaction with water to form hydroxides. Particularly preferred are hydroxides of alkali metals or alkaline earth metals, more particularly magnesium hydroxide, calcium hydroxide and/or barium hydroxide. A most preferred base is calcium hydroxide.

In particularly preferred embodiments of the two- or multi-component composition of the invention, the acid HS and the inorganic base BA are selected such that a sparingly soluble salt is formed in the neutralization. A sparingly soluble salt for the purposes of the present invention represents a pair of ions which at 23° C. exhibits at least 25 wt %, preferably at least 50 wt %, spontaneous precipitation, based on the ions present overall, in the form of a salt from the solution. Preferred acid-base pairs are alkali metal or alkaline earth metal hydroxides or oxides paired with sulfuric acid, which then precipitate as alkali metal or alkaline earth metal sulfates, or the same bases paired with phosphoric acid, which then precipitate as alkali metal or alkaline earth metal phosphates. Likewise suitable is the combination of tartaric acid with calcium or potassium hydroxide, precipitating in the form of calcium or potassium tartrate. A particularly preferred combination is that of calcium hydroxide with phosphoric acid, which precipitates as calcium phosphate. The advantage of these precipitation reactions is an improved adhesion effect on the part of the adhesion promoter composition, and an improved build-up of the layer of adhesion promoter on the substrate.

Preferred embodiments of the composition of the invention further comprise at least one water-soluble carboxylic acid CHS. This acid may also be employed as acid HS in two- or multicomponent embodiments.

Carboxylic acids are considered water-soluble for the purposes of the present invention if at 23° C. in deionized water they are soluble at not less than 50 g of carboxylic acid per liter of water, and form largely stable solutions. Preferred carboxylic acids here are those having a higher solubility.

Particularly suitable water-soluble carboxylic acids CHS are the following: saturated aliphatic monocarboxylic acids, such as particularly formic acid, acetic acid, propionic acid, butyric acid, and isobutyric acid; monounsaturated aliphatic carboxylic acids such as acrylic acid; saturated or unsaturated dicarboxylic acids such as succinic acid, glutaric acid, adipic acid, pimelic acid, maleic acid, fumaric acid or oxalic acid; hydroxycarboxylic acids such as malic acid, citric acid, glycolic acid, isocitric acid, mandelic acid, lactic acid, tartronic acid, and tartaric acid; keto acids such as pyruvic acid, acetoacetic acid, levulinic acid or oxaloacetic acid. Preferred in particular are monocarboxylic acids having 4 or fewer carbon atoms, or polycarboxylic acids having 8 or fewer carbon atoms, and also hydroxycarboxylic acids and keto acids, and also mixed forms of these. A most preferred acid is acetic acid. Acetic acid possesses in particular the advantages that it develops an excellent stabilizing effect in the composition of the invention, presents no workplace safety problems when in aqueous dilution, is readily available on favorable terms everywhere, and poses no hazard to the environment.

The one- or two-component composition may comprise further, optional constituents besides water. Examples of such additional constituents are surfactants, acids, adhesion promoter additives, catalysts, cosolvents, biocides, antisettling agents, stabilizers, inhibitors, pigments, dyes, corrosion inhibitors, odorants, UV indicators, thixotropic agents, fillers, defoamers, further organosilanes, and titanates.

Preferred embodiments of the adhesion promoter composition of the invention, in component KA and/or in component KB if they are at least two-component, or in component KAB if they are one-component, additionally comprise at least one defoamer and/or at least one silane catalyst and/or at least one further organosilane, more particularly at least one mercaptosilane, and/or at least one pigment, more particularly carbon black.

A silane catalyst is a compound capable of catalyzing the hydrolysis and/or condensation of organosilanes. Such compounds are very well known to the person skilled in the art and include, for example, metal complexes such as tin complexes, titanates, zirconates and the like, and also organic compounds with tertiary amines such as N-alkylated morpholines, guanidines or amidines. Preferred for the present invention are tin complexes such as dibutyltin dilaurate.

Further preferred additional constituents of the one-, two- or multicomponent aqueous adhesion promoter composition are surfactants. Surfactants which can be used are natural or synthetic compounds which, in solutions, lower the surface tension of the water or other liquids. As surfactants, also called wetting agents, it is possible to use anionic, cationic, nonionic or ampholytic surfactants or mixtures thereof.

Examples of anionic surfactants are those containing carboxylate, sulfate, phosphate or sulfonate groups, such as, for example, amino acid derivatives, fatty alcohol ether sulfates, fatty alcohol sulfates, soaps, alkylphenol ethoxylates, fatty alcohol ethoxylates, and also alkanesulfonates, olefin-sulfonates or alkyl phosphates.

The nonionic surfactants include, for example, ethoxylates, such as ethoxylated adducts of alcohols, such as, for example, polyoxyalkylene polyols, amines, fatty acids, fatty acid amides, alkylphenols, ethanolamides, fatty amines, polysiloxanes or fatty acid esters, for example, but also alkyl- or alkylphenyl polyglycol ethers, such as fatty alcohol polyglycol ethers, or fatty acid amides, alkylglycosides, sugar esters, sorbitan esters, polysorbates or trialkylamine oxides, and also esters and amides of poly(meth)acrylic acids with polyalkylene glycols or aminopolyalkylene glycols, which may be capped at no more than one end by alkyl groups.

Examples of cationic surfactants are quaternary ammonium compounds or phosphonium compounds, such as, for example, tetraalkylammonium salts, N,N-dialkylimidazoline compounds, dimethyldistearylammonium compounds, or N-alkylpyridine compounds, especially ammonium chlorides. The ampholytic or amphoteric surfactants include amphoteric electrolytes, known as ampholytes, such as aminocarboxylic acids, for example, and betaines.

Surfactants of these kinds are widely available commercially. Particularly suitable are alkoxylated alcohols, alkoxylated nonionic fluorosurfactants, especially Zonyl® FSO-100, which is available commercially from ABCR, Germany, alkoxylated alcohols or alkoxylated alkylphenols, especially Antarox FM 33, which is commercially available commercially from Rhodia. Also preferred are alkoxylated fatty alcohols, such as Hydropalat® 120 from Cognis. Employed with particular preference as surfactant is Hydropalat® 3031 from Cognis.

The adhesion promoter composition of the invention preferably comprises further ingredients, of the kind customary in adhesion promoter compositions and described for example in WO 2008/037780, more particularly compounds of the kind described therein as epoxysilane ES or ESx.

With particular preference the adhesion promoter composition comprises silanes, optionally at least partly in the form of their siloxanes, and also pigments. Preferred silanes are epoxysilanes, more particularly 3-glycidyl-oxypropylsilanes, adducts of epoxysilanes and aminosilanes, and also oligomeric and/or partially or wholly hydrolyzed recation products of organosilanes.

Preferred pigments are iron pigments and, in particular, carbon black. An example of the advantage of using pigments and/or carbon black is that in compositions having at least two components, one component is colored with pigments and/or carbon black and so it is easier for the user to distinguish between the components, allowing errors to be avoided. In addition, an adhesion promoter composition colored using carbon black and/or pigments also indicates the correct presence of the layer of adhesion promoter on the substrate after application.

The present invention can be formulated either as a particularly storage-stable, at least two-component adhesion promoter composition, or as a particularly user-friendly, at least one-component adhesion promoter composition.

"Storage-stable" or "storable" is an epithet applied to a substance or composition when it can be kept at room temperature in a suitable container for a relatively long time, typically at least 3 months up to 6 months or more, without suffering alteration—to any extent relevant to its use—in its application or service properties as a result of the storage. In particular, adhesion promoter compositions are considered to be storage-stable in the sense of the present invention if they exhibit no substantial detractions from the adhesion-promotion effect after the storage periods defined for example above or at the relevant locations.

Preferred at least two-component inventive compositions comprise a component KA and a component KB. These two components are storage-stable for at least 9 months, each independently of one another, and in preferred embodiments for at least a year, and are mixed shortly before application. The mixture of the two components has a long open time of at least a week, in preferred embodiments at least 2 to 3 weeks, or longer. It is possible without restriction to combine an old component KA, prepared for example six months previously, with a fresh component KB, or vice versa, without significant detriment to the performance of the adhesion promoter composition.

The optimum mixing ratio of the components KA to the components KB can be controlled via the amount of the constituents in the components. Here it should be ensured that in component KA there is to be sufficient acid HS present in order to stabilize the aminosilanes AS by protonation. At the same time, component KB is to be metered such that when the two components KA and KB are combined, the acid HS is neutralized by the inorganic base BA, and the aminosilanes AS are able to develop improved adhesion to the bond substrate. The person skilled in the art is capable of calculating a sensible composition from the characteristic values of the raw materials, such as amine number, for example, and from the amounts employed, and of optimizing this composition by experiments, such as pH measurements and adhesion tests.

Regarding the mixing ratio of the components KA and KB to one another, it is possible to employ a 1:1 mixing ratio of KA:KB. In many embodiments, however, it has proven advantageous to use a mixing ratio of KA:KB of 2:1, 3:1, 4:1 or higher. Adding a small volume of KB to a large volume of KA results in advantages for the user. Thus it is possible for example to provide a large vessel, a pail for example, with component KA, which still includes sufficient free volume for the addition of a small volume of component KB—a bottle or a pouch, for example. As a further advantage, the mixing system is in this way less susceptible to error than if it were necessary to observe a strict 1:1 ratio. An additional advantage to the user, if component KB contains carbon black or pigments, is that it is immediately apparent whether the components have already been mixed or not. Adding a small volume of dark component KB to a large volume of light component KA results in a distinguishable mixed color in the completed mixture of KA and KB.

In other preferred embodiments, the adhesion promoter composition of the invention comprises an individual component KAB which contains all of the constituents essential to the invention. These embodiments possess a storage stability of at least 3 months, and in preferred embodiments storage stabilities of at least 6 months. An advantage of these embodiments, of course, is the absence of the mixing of the components before use, and the adhesion promoter compositions can be applied directly. This reduces possible user errors and reduces the need for storage space, and necessary operating steps, thereby shortening cycle times. When formulating the individual component KAB, care should be taken to ensure that there is a sufficiently high excess of water-soluble carboxylic acid CHS in comparison to amine hardener AH, so that the excess acid still has a stabilizing effect on the aminosilane AS. The required amount can be calculated by the person skilled in the art from the amine number of the amine hardener AH and the amount employed. It has proven advantageous to use an excess of, for example, 1 mole percent or more of carboxyl groups in the water-soluble carboxylic acid CHS, relative to the moles of amino groups in the amine hardener AH.

It is of course also possible for further components—for example, components which comprise further organosilanes, catalysts, or dyes—to be part of a multicomponent system of the invention. Such additional components allow optimizations to be made, for example, for particular bond substrates, by means of additional organosilanes or other additives, or are able to meet specific esthetic requirements, such as color, for example, or permit the addition of particular stabilizers, such as UV stabilizers, which would be unnecessary or too expensive for general use.

One particularly preferred embodiment of an at least two-component adhesion promoter composition in accordance with the present invention comprises: a first component KA comprising
  a) 75 to 95 wt % of an aqueous dispersion of at least one solid epoxy resin EP having a solids content of 50 to 60%, based on the aqueous dispersion;
  b) 0.5 to 2 wt % of at least one aminosilane AS; and
  c) 0.5 to 5 wt % of at least one acid HS, and also
  d) sufficient water to make the sum of the individual constituents a) to d) of component KA 100 wt %; and
a second component KB, comprising
  a) 5 to 35 wt % of an aqueous dispersion of at least one amine hardener AH having a solids content of 75 to 85%, based on the aqueous dispersion;
  b) 0.5 to 10 wt % of at least one inorganic base BA;
  c) 0 to 35 wt % of carbon black and/or pigments;
  d) 0 to 0.5 wt % of at least one silane catalyst;
  e) 0 to 2 wt % of at least one wetting agent; and also
  f) sufficient water to make the sum of the individual constituents a) to f) of component KB 100 wt %.

In the case of at least two-component adhesion promoter compositions of this kind, a volume mixing ratio of KA:KB of between 1:1 and 4:1 in particular has proven to be particularly advantageous.

In general it is preferred for the ratio of the epoxide equivalents of the solid epoxy resin EP in component KA to the amine hydrogen equivalents of the amine hardener AH in component KB to be selected such that there is a slight excess of epoxide equivalents. This means, for example, that there is preferably a 1 to 10% excess of epoxide equivalents.

Another particularly preferred embodiment is a one-component composition which comprises a single component KAB which comprises the following:
  a) 35 to 50 wt % of an aqueous dispersion of at least one solid epoxy resin EP having a solids content of 50 to 60%, based on the aqueous dispersion;
  b) 0.25 to 1 wt % of at least one aminosilane AS;
  c) 0.25 to 2.5 wt % of at least one water-soluble carboxylic acid CHS;
  d) 1 to 10 wt % of an aqueous dispersion of at least one amine hardener AH having a solids content of 75 to 85%, based on the aqueous dispersion; and also
  e) sufficient water to make the sum of the individual constituents a) to e) of component KAB 100 wt %.

Following preparation, the individual components are typically packaged separately from one another into impervious packaging. Suitable packaging material includes, in particular, plastics, such as polyethylene or polypropylene, acid-resistant metals, metal-coated plastics, or glass, for example, of which plastic containers are preferred. The aqueous compositions of the invention or their components are of course not sensitive toward atmospheric moisture and need not be stored in particularly impervious—especially gastight—packaging. Nevertheless, it must be ensured that substantial quantities of water are unable to evaporate from the containers, or that unwanted extraneous substances are unable to penetrate the containers. The individual components are storage-stable separately from one another. The adhesion promoter composition of the invention is stored in particular at temperatures in the range from 5 to 30° C. This ensures the stability of the aqueous dispersion of the solid epoxy resin.

The present invention further relates to the use of an adhesion promoter composition of the kind described above as a primer for adhesives, sealants or coatings. Using an adhesion promoter composition of this kind enhances the adhesion of the adhesive, sealant or coating under hot and humid conditions, especially after storage under conditions of heat and humidity.

The adhesion promoter composition is used preferably as a primer for adhesives or sealants.

The adhesion promoter composition of the invention is applied typically by means of cloth, felt, roller, spraying, sponge, brush, dip coating or the like, and may be applied either manually or by robot.

Where the adhesion promoter composition is a multicomponent adhesion promoter composition, the components are mixed before or in the course of application.

In detail, a preferred method for applying a two-component adhesion promoter composition of the invention consists typically of the following steps:
  a) mixing components KA and KB by combining the two components, preferably by tipping component KB into the vessel of the components KA, and subsequently stirring and/or shaking the resultant mixture;
  b) applying the mixture of components KA and KB to the surface to be bonded or coated, preferably by means of an impregnated sponge, brush or felt or by means of spraying;
  c) flashing off the applied adhesion promoter composition until the water present has undergone at least partial evaporation, preferably accelerated through use of a fan or blower;
  d) applying the adhesive or sealant to the bonding surface pretreated by steps a) to c).

Following the application, a usual step, as described in section c), is the flashing-off of the adhesion promoter composition. Flashing off may take place under atmospheric conditions or at most at elevated temperature, under subatmospheric pressure and/or by application of a blown gas, through the use, for example, of a fan or blow dryer, which may result in a shortening of the flash-off time. Without further measures, the compositions of the invention typically require flash-off times of between 15 min and 2 h, the time being reduced by a dry and/or hot environment. By using a fan or blow dryer it is easily possible to shorten the flash-off time to no more than 5 min, preferably no more than one minute.

One-component adhesion promoter compositions of the invention comprising a single component KAB are preferably also used in accordance with the method identified above, of course there being no need for a mixing operation in step a), since the mixture is already a completed mixture. Nevertheless, it may be advantageous to shake or stir component KAB prior to application, in order to ensure maximum homogeneity of mixing.

The adhesion promoter composition of the invention is suitable for different kinds of substrates, such as metals and alloys, for example, more particularly steels, aluminum, and nonferrous metals, and also their alloys, concrete, mortar, brick, klinker, natural stone, glass, ceramic, glass-ceramic, wood, and plastics such as polystyrene. Preferred substrates are inorganic substrates, more particularly glass and glass-ceramic, metals, and also concrete and mortar.

The substrates may where necessary be pretreated before the adhesion promoter composition of the invention is applied. Such pretreatments include, in particular, physical and/or chemical cleaning processes, examples being sanding, sandblasting, brushing or the like, or treatment with cleaners or solvents.

The adhesive or sealant used may in principle be any customary adhesive or sealant. More particularly it is a moisture-curing adhesive or sealant.

Suitable adhesives and sealants are, in particular, polyurethane adhesives and sealants, especially those which comprise polyurethane polymers containing isocyanate groups.

The adhesion promoter composition of the invention is further suitable in particular for silane-crosslinking adhesives and sealants as well.

The adhesion promoter composition of the invention is especially suitable for elastic, moisture-curing adhesives, of the kind sold commercially under the Sikaflex®, SikaTack® and SikaBond® product lines from Sika Schweiz AG.

Preferred fields of application of the adhesion promoter composition of the invention are located in the construction and manufacturing industries and also in vehicle construction, particularly for joint sealing, wood-floor bonding, accessory-component bonding, seam sealing, cavity sealing, assembly, bodywork bonding, glass bonding, and the like.

The present invention further relates to articles which have been bonded or coated using an adhesion promoter composition of the invention, or have been pretreated for the purpose of bonding or coating.

Examples of articles which are produced by the bonding, sealing or coating of a substrate using an adhesion promoter composition of the invention include built structures, more particularly built structures in civil engineering or construction, means of transport, vehicles for example, more particularly automobiles, buses, trucks, rail vehicles, or boats, or accessory components thereof. The adhesion promoter composition of the invention is employed preferably for elastic bonds in vehicle construction, such as, for example, the bonded attachment of parts, such as plastic covers, trim strips, flanges, bumpers, driver's cabins or other accessory components, to the painted body of a means of transport, or the bonding of glass into the body.

EXAMPLES

Set out hereinbelow are working examples which are intended to elucidate in more detail the invention described. Of course, the invention is not confined to these working examples described.

Raw Materials Used

Common chemicals which are traded as pure substances under their chemical name, such as phosphoric acid, for example, were obtained from Sigma Aldrich Switzerland. The chemicals known by a trade name are listed below. The water used was always standard laboratory deionized water.

| | |
|---|---|
| A-1110 | 3-Aminopropyltrimethoxysilane Silquest ® A-1110, Momentive Performance Materials, Germany |
| A-1120 | N-(2-Aminoethyl)-3-aminopropyltrimethoxysilane Silquest ® A-1120, Momentive Performance Materials, Germany |
| A-1130 | Diethylenetriaminopropyltrimethoxysilane Silquest ® A-1130, Momentive Performance Materials, Germany |
| A-1170 | Bis(trimethoxysilylpropyl)amine Silquest ® A-1170, Momentive Performance Materials, Germany |
| A-187 | 3-Glycidyloxypropyltrimethoxysilane Silquest ® A-187, Momentive Performance Materials, Germany |
| A-189 | 3-Mercaptopropyltrimethoxysilane Silquest ® A-189, Momentive Performance Materials, Germany |
| Hydropalat 3031 | Surfactant, Hydropalat ® 3031, Cognis, Germany |
| AR555 | Aqueous dispersion of a solid epoxy resin with 55% solids fraction, Ancarez ® AR555, AirProducts, USA |
| Beckopox 623 | Aliphatic polyamine adduct, aqueous dispersion with 80% solids fraction, Beckopox ® EH 623 W, Allnex, Germany |
| Carbon black | Low color furnace black, Printex ® 25, Evonik Industries, Germany |
| Dispersant | Copolymer preparation, Disperbyk ®-191, Byk Chemie, Germany |
| Defoamer | Polymer preparation, Byk ®-014, Byk Chemie, Germany |
| Catalyst | Dibutyltin dilaurate (DBTL), TIB KAT ® 218, TIB Chemicals, Germany |

Production of the Adhesion Promoter Compositions

Production of Components KA for Two-Component Adhesion Promoters

A series of inventive (KA1 to KA3) and also two noninventive (KA4 and KA5) components KA were produced. The amounts of the individual ingredients are listed in wt % in table 1. KA4 is not inventive since it contains no aminosilane AS; KA5 is not inventive since it contains no acid HS or CHS.

TABLE 1

Inventive and noninventive components KA produced for the corresponding example compositions. All quantities in wt % are based on the overall respective component KA.

| | KA1 | KA2 | KA3 | KA4 (Ref.) | KA5 (Ref.) |
|---|---|---|---|---|---|
| AR555 | 89 | 89 | 89 | 94 | 90 |
| Water | — | — | — | 2 | — |
| Acetic acid | 1 | 1 | 1 | — | — |

TABLE 1-continued

Inventive and noninventive components KA produced for the corresponding example compositions. All quantities in wt % are based on the overall respective component KA.

|  | KA1 | KA2 | KA3 | KA4 (Ref.) | KA5 (Ref.) |
|---|---|---|---|---|---|
| Silane mixture ES1 | — | — | — | 4 | — |
| Silane mixture AS1 | 10 | — | — | — | — |
| Silane mixture AS2 | — | 10 | — | — | — |
| Silane mixture AS3 | — | — | 10 | — | — |
| Silane mixture AS4 | — | — | — | — | 10 |
| Total (wt %) | 100 | 100 | 100 | 100 | 100 |

The production of components KA was identical in all cases. First, AR-555 was placed in a reactor and, with stirring, the acetic acid (glacial acetic acid; Sigma Aldrich Switzerland) or the additional water (in the case of KA4) was added. Thereafter, with vigorous stirring, the respective silane mixture was added slowly. The product in all cases was a milky fluid which was homogeneous but nontransparent.

Production of the Silane Mixtures

A series of silane mixtures for use in component KA were produced according to the compositions in wt % indicated in table 2, based on the respective silane mixtures. These silane mixtures then either were added as inventive aminosilanes AS to the corresponding components KA, or they served as an additive for reference compositions.

TABLE 2

Exemplary silane mixtures used in components KA. All quantities in wt % are based on the overall respective silane mixture.

|  | ES1 | AS1 | AS2 | AS3 | AS4 |
|---|---|---|---|---|---|
| Water | 55 | 70 | 77.5 | 77.5 | 80 |
| $H_3PO_4$ | 5 | 15 | 10 | — | — |
| $H_2SO_4$ | — | — | — | 10 | — |
| Potassium hydroxide | — | — | — | — | 10 |
| Hydropalat 3031 | — | 5 | 2.5 | 2.5 | — |
| A-1110 | — | 2.22 | 2.86 | 2.86 | 2.86 |
| A-1120 | — | 2.22 | 2.86 | 2.86 | 2.86 |
| A-1170 | — | 2.22 | 2.86 | 2.86 | 2.86 |
| A-189 | — | 1.11 | 1.43 | 1.43 | 1.43 |
| A-187 | 40 | — | — | — | — |
| A-1130 | — | 2.22 | — | — | — |
| Total (wt %) | 100 | 100 | 100 | 100 | 100 |

The silane mixtures AS1 to AS4 were produced according to an identical scheme: First of all, the acid or base (where present), Hydropalat 3031, and water were premixed. The individual silanes were added slowly dropwise with stirring to this mixture at 23° C. under a nitrogen atmosphere. During the dropwise addition, care was taken to ensure that the silanes were added slowly and the solution remained clear. After all the silanes had been added, the solution was stirred for an hour. In all cases, a clear, colorless mixture was obtained. In the case of ES1, A-187 was added as the final raw material.

Production of Components KB for Two-Component Adhesion Promoters

A series of inventive (KB1 to KB5) and also one noninventive (KB6) components KB were produced. The amounts of the individual ingredients are listed in wt % in table 3. KB6 is not inventive since it contains no organic base BA.

TABLE 3

Inventive and noninventive components KB produced for the corresponding example compositions. All quantities in wt % are based on the overall respective component KB.

|  | KB1 | KB2 | KB3 | KB4 | KB5 | KB6 (Ref.) |
|---|---|---|---|---|---|---|
| Beckopox 623 | 27.8 | 7.7 | 7.7 | 7.7 | 7.7 | 30.76 |
| Water | 67.7 | 78.15 | 66.75 | 90.64 | 71.4 | 69.24 |
| $Ca(OH)_2$ | 4.5 | 1.15 | 1 | — | — | — |
| $Ba(OH)_2$ | — | — | — | 1.66 | — | — |
| $Mg(OH)_2$ | — | — | — | — | 0.8 | — |
| Carbon black | — | 12 | 24 | — | 20 | — |
| Dispersant | — | 1 | 0.5 | — | — | — |
| Defoamer | — | — | 0.03 | — | 0.05 | — |
| Catalyst | — | — | 0.02 | — | 0.05 | — |
| Total (wt %) | 100 | 100 | 100 | 100 | 100 | 100 |

The example components KB were always produced according to the following scheme: First, the amine hardener AH (Beckopox 623) was mixed with approximately half the water in a reactor, resulting in a decrease in viscosity and a greater ease in stirring. Thereafter the remainder of the water was added slowly with stirring, with the inorganic base BA dissolved therein, and also, where present, carbon black, dispersant, defoamer and catalyst dispersed therein. The mixture was subsequently stirred further for around 15 minutes until the resulting mixture was homogeneous and colorless or, if containing carbon black, was black.

Production of Components KAB for One-Component Adhesion Promoters

An inventive single component KAB1 and a noninventive single component KAB2 were produced. The fractions in wt % of the individual components KAB1 and KAB2 are set out in table 4. KAB2 is not inventive since no water-soluble carboxylic acid CHS is included.

TABLE 4

Inventive and noninventive components KAB produced for the corresponding example adhesion promoter compositions. All quantities in wt % are based on the overall respective component KAB.

|  | KAB1 | KAB2 (Ref.) |
|---|---|---|
| AR555 | 61 | 61 |
| A-1110 | 0.45 | 0.45 |
| A-1120 | 0.45 | 0.45 |
| A-1170 | 0.45 | 0.45 |
| A-189 | 0.15 | 0.15 |
| Beckopox 623 | 6 | 6 |
| Water | 29.5 | 31.5 |
| Acetic acid | 2 | — |
| Total (wt %) | 100 | 100 |

KAB1 was produced in a number of steps. First of all, approximately half of the water used was introduced with half of the acetic acid in a glass flask. The silanes were then added slowly and the mixture was shaken. Thereafter AR555 was charged to a reactor and the silane mixture was added. With stirring, all of the ingredients were mixed. In a second reactor, Beckopox 623 was likewise diluted with the remainder of the water and stirred for several minutes. Thereafter the remainder of the acetic acid was admixed, and stirring was continued. The contents of the second reactor were subsequently added with the amine hardener to the contents of the first reactor. The mixture was stirred for one hour more until a milky, homogeneous mixture was obtained.

KAB2 was produced in an almost identical process, except that the acetic acid was replaced by water. Again a milky, homogeneous mixture was obtained. This mixture, however, underwent gelling within four weeks after production, and could only be used in fresh form.

Production of the Ready-to-Use One- or Two-Component Adhesion Promoter Compositions For the production of the two-component adhesion promoter compositions, the respective components KA and KB were mixed in a suitable volume ratio. Unless otherwise indicated in the adhesion results, this ratio is always 1:1. Mixing was accomplished by conjoint pouring and subsequent shaking for 5 minutes. The single component KAB was shaken only for 5 minutes prior to use. The completed adhesion promoter compositions are labeled Z1 to Z14 and are specified in table 5 and in the tables relating to the adhesion results.

TABLE 5

Ready-mixed inventive and noninventive (reference) adhesion promoter compositions Z1 to Z14, consisting of the respective components KA and KB or KAB.

| Adhesion promoter composition | KA | KB | KAB |
|---|---|---|---|
| Z1 | KA1 | KB1 | — |
| Z2 | KA2 | KB1 | — |
| Z3 | KA2 | KB2 | — |
| Z4 | KA2 | KB3 | — |
| Z5 | KA2 | KB4 | — |
| Z6 | KA2 | KB5 | — |
| Z7 (Ref.) | KA2 | KB6 | — |
| Z8 | KA3 | KB3 | — |
| Z9 (Ref.) | KA4 | KB1 | — |
| Z10 (Ref.) | KA4 | KB6 | — |
| Z11 (Ref.) | KA5 | KB3 | — |
| Z12 (Ref.) | KA5 | KB6 | — |
| Z13 | — | — | KAB1 |
| Z14 (Ref.) | — | — | KAB2 |

Adhesion Tests for Adhesion Promotion and Storage Stability

The individual completed aqueous adhesion promoter compositions Z1 to Z14 of table 5 were tested, with regard to their promotion of adhesion to various substrates, as adhesion promoters in combination with various adhesives. To verify the storage stability, individual components KA, KB or KAB were stored for different times (up to 13 months) at 23° C. In some cases, in order to simulate accelerated aging, storage was carried out at an elevated temperature.

Adhesives used for the test bonds were SikaTack® MOVE$^{IT}$ ("Move"), Sikaflex®-205 HMA-3 ("HMA3"), Sikaflex®-250 HMV-2+("HMV2"), and Sikaflex®-265 ("S256"), which are one-component moisture-curing polyurethane adhesives that comprise polyurethane prepolymers having isocyanate groups and are available commercially from Sika Schweiz AG.

Substrates used were float glass (tin-side "F—Sn" or air-side "F-air"), Ferro Frit 14251 ("14251"), Ferro Frit 3402 ("3402"), and Ferro Frit 14279 ("14279"). The aforementioned glass substrates are sold by Rocholl AG, Germany. They are laboratory substrates corresponding to the usual commercial glass ceramics for VSG and ESG glasses. Ferro is the manufacturer of the glass ceramic paste; the numbers are the type designation of the ceramics used.

The aqueous compositions were applied to the respective substrate using a melamine sponge soaked with the compositions, and were flashed off for 60 minutes. A triangular bead of the adhesive was applied by extrusion cartridge and nozzle under standard conditions (23±1° C., 50±5% relative humidity).

The bond was tested after a cure time of normally 7 days of conditioned storage under standard conditions at 23° C. ("RT") and 50% relative humidity, and also after subsequent heat-and-humidity storage ("CP") at 70° C. and 100% relative humidity for up to 21 days. The precise conditions of storage and the respective storage times are reported in the corresponding tables.

The adhesion of the adhesive was tested by means of a 'bead test'. In this test, the bead is incised at the end just above the bond area. The incised end of the bead is held with rounded-end tweezers and pulled from the substrate. This is done by cautiously rolling the bead up onto the tip of the tweezers, and by applying a cut at right angles to the direction of bead pulling, down to the bare substrate. The bead pulling rate should be selected such that a cut has to be made approximately every 3 seconds. The test distance must be at least 8 cm. After the bead has been pulled off, an assessment is made of the adhesive remaining on the substrate (cohesive fracture). The adhesion properties are evaluated by visual determination of the cohesive component of the adhesion area.

The higher the cohesive fracture component, the better the estimation of the bond. Test results with cohesive fractures of less than 70% are typically considered to be inadequate. A cohesive fracture of 0% corresponds to a 100% adhesive fracture with complete failure of the bond and thus of the adhesion promoter. The results (numbers in % cohesive fracture) are summarized in tables 6a to 14b.

TABLE 6a

Comparison of inventive adhesion promoter compositions Z4 and Z8 with nonadhesive composition Z7 through bonds of different substrates using different adhesives after 7 d (days) RT and 7 d RT + 7 d CP.

| | Storage | 7 d RT Adhesive | | | | 7 d CP Adhesive | | | |
|---|---|---|---|---|---|---|---|---|---|
| Ex. | Substrate | Move | HMA3 | HMV2 | S265 | Move | HMA3 | HMV2 | S265 |
| Z4 | F—Sn | 100 | 100 | 100 | 100 | 100 | 100 | 100 | 100 |
| | F-air | 100 | 100 | 100 | 100 | 100 | 100 | 100 | 100 |
| | 3402 | 100 | 100 | 100 | 100 | 100 | 100 | 100 | 100 |
| | 14251 | 100 | 100 | 100 | 100 | 100 | 100 | 100 | 100 |
| | 14279 | 100 | 100 | 100 | 100 | 100 | 100 | 100 | 100 |
| Z8 | F—Sn | 100 | 100 | 100 | 100 | 100 | 100 | 100 | 100 |
| | F-air | 100 | 100 | 100 | 100 | 100 | 100 | 100 | 0 |

TABLE 6a-continued

Comparison of inventive adhesion promoter compositions Z4 and Z8 with nonadhesive composition Z7 through bonds of different substrates using different adhesives after 7 d (days) RT and 7 d RT + 7 d CP.

| Storage | | 7 d RT Adhesive | | | | 7 d CP Adhesive | | | |
|---|---|---|---|---|---|---|---|---|---|
| Ex. | Substrate | Move | HMA3 | HMV2 | S265 | Move | HMA3 | HMV2 | S265 |
| | 3402 | 100 | 100 | 100 | 100 | 100 | 99 | 100 | 100 |
| | 14251 | 100 | 100 | 100 | 100 | 100 | 100 | 100 | 10 |
| | 14279 | 100 | 100 | 100 | 100 | 100 | 90 | 100 | 100 |
| Z7 (Ref) | F—Sn | 10 | 10 | 50 | 100 | 0 | 0 | 0 | 0 |
| | F-air | 10 | 10 | 30 | 100 | 0 | 0 | 0 | 0 |
| | 3402 | 10 | 70 | 30 | 100 | 100 | 100 | 100 | 100 |
| | 14251 | 10 | 70 | 50 | 100 | 0 | 0 | 0 | 0 |
| | 14279 | 10 | 30 | 10 | 100 | 0 | 0 | 95 | 80 |

TABLE 6b

Comparison of inventive adhesion promoter compositions Z4 and Z8 with nonadhesive composition Z7 through bonds of different substrates using different adhesives after 7 d RT + 14 d CP and 7 d RT + 21 d CP.

| Storage | | 14 d CP Adhesive | | | | 21 d CP Adhesive | | | |
|---|---|---|---|---|---|---|---|---|---|
| Ex. | Substrate | Move | HMA3 | HMV2 | S265 | Move | HMA3 | HMV2 | S265 |
| Z4 | F—Sn | 100 | 100 | 100 | 100 | 100 | 100 | 100 | 100 |
| | F-air | 100 | 100 | 100 | 100 | 100 | 100 | 100 | 100 |
| | 3402 | 100 | 100 | 100 | 100 | 100 | 100 | 100 | 100 |
| | 14251 | 100 | 100 | 100 | 100 | 100 | 100 | 100 | 100 |
| | 14279 | 100 | 100 | 100 | 100 | 100 | 100 | 100 | 100 |
| Z8 | F—Sn | 100 | 99 | 100 | 0 | 100 | 90 | 100 | 0 |
| | F-air | 100 | 99 | 100 | 0 | 99 | 90 | 100 | 0 |
| | 3402 | 100 | 30 | 100 | 10 | 100 | 0 | 100 | 10 |
| | 14251 | 100 | 80 | 100 | 0 | 99 | 90 | 95 | 0 |
| | 14279 | 100 | 20 | 100 | 10 | 100 | 0 | 100 | 0 |
| Z7 (Ref) | F—Sn | 0 | 0 | 0 | 0 | 0 | 0 | 0 | 0 |
| | F-air | 0 | 0 | 0 | 0 | 0 | 0 | 0 | 0 |
| | 3402 | 100 | 100 | 100 | 100 | 100 | 100 | 100 | 100 |
| | 14251 | 0 | 0 | 0 | 0 | 0 | 0 | 0 | 0 |
| | 14279 | 0 | 0 | 95 | 80 | 0 | 0 | 90 | 50 |

Tables 6a and 6b show that the inventive adhesion promoter compositions Z4 and Z8 are significantly superior to the noninventive composition Z7, especially after heat-and-humidity storage.

TABLE 7a

Comparison of inventive adhesion promoter composition Z1 with nonadhesive composition Z10 through bonds of different substrates using different adhesives after 7 d (days) RT and 7 d RT + 7 d CP. Volume mixing ratio of KA to KB in both cases Z1 and Z10 was 4:1.

| Storage | | 7 d RT Adhesive | | | | 7 d CP Adhesive | | | |
|---|---|---|---|---|---|---|---|---|---|
| Ex. | Substrate | Move | HMA3 | HMV2 | S265 | Move | HMA3 | HMV2 | S265 |
| Z1 | F—Sn | 100 | 99 | 100 | 100 | 100 | 100 | 100 | 100 |
| | 14279 | 90 | 99 | 100 | 100 | 100 | 100 | 100 | 100 |
| | 14251 | 100 | 100 | 100 | 100 | 100 | 100 | 100 | 100 |
| | 3402 | 99 | 100 | 100 | 100 | 90 | 95 | 100 | 100 |
| Z10 (Ref.) | F—Sn | 0 | 0 | 30 | 10 | 0 | 0 | 0 | 100 |
| | 14279 | 100 | 20 | 100 | 100 | 0 | 0 | 0 | 50 |
| | 14251 | 100 | 100 | 100 | 100 | 0 | 0 | 0 | 20 |
| | 3402 | 100 | 100 | 100 | 100 | 0 | 0 | 0 | 0 |

TABLE 7b

Comparison of inventive adhesion promoter composition Z1 with nonadhesive composition Z10 through bonds of different substrates using different adhesives after 7 d RT + 14 d CP and 7 d RT + 21 d CP. Volume mixing ratio of KA to KB in both cases Z1 and Z10 was 4:1.

| Ex. | Storage Substrate | 14 d CP Adhesive | | | | 21 d CP Adhesive | | | |
|---|---|---|---|---|---|---|---|---|---|
| | | Move | HMA3 | HMV2 | S265 | Move | HMA3 | HMV2 | S265 |
| Z1 | F—Sn | 95 | 100 | 100 | 99 | 70 | 60 | 90 | 95 |
| | 14279 | 99 | 99 | 99 | 100 | 95 | 95 | 99 | 99 |
| | 14251 | 95 | 100 | 100 | 100 | 50 | 99 | 100 | 100 |
| | 3402 | 20 | 70 | 100 | 100 | 10 | 20 | 100 | 100 |
| Z10 (Ref.) | F—Sn | 0 | 0 | 0 | 80 | 0 | 0 | 0 | 50 |
| | 14279 | 0 | 0 | 0 | 20 | 0 | 0 | 0 | 30 |
| | 14251 | 0 | 0 | 0 | 0 | 0 | 0 | 0 | 0 |
| | 3402 | 0 | 0 | 0 | 0 | 0 | 0 | 0 | 0 |

The comparison of the inventive Z1 with the noninventive Z10 (without aminosilane AS and without inorganic base BA) in tables 7a and 7b shows clearly the superiority of the inventive adhesion promoter composition.

TABLE 8a

Comparison of inventive adhesion promoter compositions Z2 and Z3 on bonds of different substrates using different adhesives after 7 d (days) RT and 7 d RT + 7 d CP. Volume mixing ratio of KA to KB in the case of Z2 was 4:1.

| Ex. | Storage Substrate | 7 d RT Adhesive | | | | 7 d CP Adhesive | | | |
|---|---|---|---|---|---|---|---|---|---|
| | | Move | HMA3 | HMV2 | S265 | Move | HMA3 | HMV2 | S265 |
| Z2 | F—Sn | 100 | 100 | 100 | 100 | 100 | 100 | 100 | 100 |
| | 14279 | 100 | 100 | 100 | 100 | 100 | 100 | 100 | 100 |
| | 14251 | 100 | 100 | 100 | 100 | 100 | 100 | 100 | 100 |
| | 3402 | 100 | 100 | 100 | 100 | 100 | 100 | 100 | 100 |
| Z3 | F—Sn | 100 | 100 | 100 | 100 | 100 | 100 | 100 | 100 |
| | 14279 | 100 | 100 | 100 | 100 | 100 | 100 | 100 | 100 |
| | 14251 | 100 | 100 | 100 | 100 | 100 | 100 | 100 | 100 |
| | 3402 | 100 | 100 | 100 | 100 | 100 | 100 | 100 | 100 |

TABLE 8b

Comparison of inventive adhesion promoter compositions Z2 and Z3 on bonds of different substrates using different adhesives after 7 d RT + 14 d CP and 7 d RT + 21 d CP. Volume mixing ratio of KA to KB in the case of Z2 was 4:1.

| Ex. | Storage Substrate | 14 d CP Adhesive | | | | 21 d CP Adhesive | | | |
|---|---|---|---|---|---|---|---|---|---|
| | | Move | HMA3 | HMV2 | S265 | Move | HMA3 | HMV2 | S265 |
| Z2 | F—Sn | 100 | 100 | 100 | 100 | 100 | 100 | 100 | 100 |
| | 14279 | 99 | 99 | 100 | 100 | 99 | 100 | 100 | 100 |
| | 14251 | 100 | 100 | 100 | 100 | 100 | 100 | 100 | 50 |
| | 3402 | 100 | 100 | 100 | 100 | 100 | 100 | 100 | 100 |
| Z3 | F—Sn | 100 | 100 | 100 | 100 | 100 | 100 | 100 | 100 |
| | 14279 | 100 | 100 | 100 | 100 | 100 | 100 | 100 | 100 |
| | 14251 | 100 | 100 | 100 | 100 | 100 | 100 | 100 | 90 |
| | 3402 | 100 | 100 | 100 | 100 | 100 | 100 | 100 | 100 |

Tables 8a and 8b show that inventive compositions with a KA:KB mixing ratio of 1:1 (Z3) and those with a ratio of 4:1 (Z2) permit outstanding adhesion results.

TABLE 9a

Comparison of inventive adhesion promoter compositions Z5 and Z6 and noninventive composition Z7 on bonds of different substrates using different adhesives after 7 d (days) RT and 7 d RT + 7 d CP.

| Ex. | Storage Substrate | 7 d RT Adhesive | | | | 7 d CP Adhesive | | | |
|---|---|---|---|---|---|---|---|---|---|
| | | Move | HMA3 | HMV2 | S265 | Move | HMA3 | HMV2 | S265 |
| Z5 | F—Sn | 99 | 100 | 100 | 100 | 0 | 0 | 80 | 100 |
| | F-air | 100 | 100 | 100 | 100 | 0 | 0 | 95 | 100 |
| Z6 | F—Sn | 100 | 100 | 100 | 100 | 20 | 70 | 30 | 100 |
| | F-air | 99 | 100 | 100 | 100 | 100 | 100 | 100 | 100 |
| Z7 (Ref.) | F—Sn | 10 | 10 | 50 | 100 | 0 | 0 | 0 | 0 |
| | F-air | 10 | 10 | 30 | 100 | 0 | 0 | 0 | 0 |

TABLE 9b

Comparison of inventive adhesion promoter compositions Z5 and Z6 and noninventive composition Z7 on bonds of different substrates using different adhesives after 7 d RT + 14 d CP and 7 d RT + 21 d CP.

| Ex. | Storage Substrate | 14 d CP Adhesive | | | | 21 d CP Adhesive | | | |
|---|---|---|---|---|---|---|---|---|---|
| | | Move | HMA3 | HMV2 | S265 | Move | HMA3 | HMV2 | S265 |
| Z5 | F—Sn | 0 | 0 | 70 | 100 | 0 | 0 | 70 | 100 |
| | F-air | 0 | 0 | 70 | 100 | 0 | 0 | 50 | 100 |
| Z6 | F—Sn | 70 | 30 | 20 | 100 | 30 | 10 | 80 | 100 |
| | F-air | 100 | 100 | 100 | 100 | 100 | 100 | 100 | 100 |
| Z7 (Ref.) | F—Sn | 0 | 0 | 0 | 0 | 0 | 0 | 0 | 0 |
| | F-air | 0 | 0 | 0 | 0 | 0 | 0 | 0 | 0 |

Tables 9a and 9b show that inventive compositions with barium hydroxide (Z5) and magnesium hydroxide (Z6) as inorganic base BA also exhibit good adhesion results. The noninventive Z7 yields significantly poorer results.

TABLE 10a

Comparison of the inventive Z8 with the noninventive adhesion promoter compositions Z11 and Z12 on bonds of different substrates using different adhesives after 3 d (days) RT and 3 d RT + 7 d CP. Volume mixing ratio of KA to KB in the case of Z12 was 2:1.

| Ex. | Storage Substrate | 7 d RT Adhesive | | | | 7 d CP Adhesive | | | |
|---|---|---|---|---|---|---|---|---|---|
| | | Move | HMA3 | HMV2 | S265 | Move | HMA3 | HMV2 | S265 |
| Z8 | F—Sn | 100 | 100 | 100 | 100 | 100 | 100 | 100 | 100 |
| | 3402 | 100 | 100 | 100 | 100 | 100 | 99 | 100 | 100 |
| | 14251 | 100 | 100 | 100 | 100 | 100 | 100 | 100 | 10 |
| | 14279 | 100 | 100 | 100 | 100 | 100 | 90 | 100 | 100 |
| Z11 (Ref.) | F—Sn | 100 | 100 | 100 | 100 | 0 | 10 | 70 | 10 |
| | 3402 | 100 | 100 | 100 | 100 | 0 | 0 | 0 | 90 |
| | 14251 | 100 | 100 | 100 | 100 | 0 | 0 | 0 | 10 |
| | 14279 | 100 | 100 | 100 | 100 | 0 | 0 | 0 | 50 |
| Z12 (Ref.) | F—Sn | 100 | 100 | 100 | 100 | 0 | 0 | 50 | 10 |
| | 3402 | 100 | 100 | 100 | 100 | 0 | 0 | 0 | 0 |
| | 14251 | 100 | 100 | 100 | 100 | 0 | 0 | 0 | 0 |
| | 14279 | 100 | 100 | 100 | 100 | 0 | 0 | 0 | 0 |

TABLE 10b

Comparison of the inventive Z8 with the noninventive adhesion promoter compositions Z11 and Z12 on bonds of different substrates using different adhesives after 7 d RT + 14 d CP and 7 d RT + 21 d CP. Volume mixing ratio of KA to KB in the case of Z12 was 2:1.

| | | 14 d CP Adhesive | | | | 21 d CP Adhesive | | | |
|---|---|---|---|---|---|---|---|---|---|
| Ex. | Substrate | Move | HMA3 | HMV2 | S265 | Move | HMA3 | HMV2 | S265 |
| Z8 | F—Sn | 100 | 99 | 100 | 0 | 100 | 90 | 100 | 0 |
| | 3402 | 100 | 30 | 100 | 10 | 100 | 0 | 100 | 10 |
| | 14251 | 100 | 80 | 100 | 0 | 99 | 90 | 95 | 0 |
| | 14279 | 100 | 20 | 100 | 10 | 100 | 0 | 100 | 0 |
| Z11 (Ref.) | F—Sn | 0 | 10 | 70 | 0 | 0 | 0 | 70 | 0 |
| | 3402 | 0 | 0 | 10 | 10 | 0 | 0 | 0 | 0 |
| | 14251 | 0 | 0 | 0 | 0 | 0 | 0 | 0 | 0 |
| | 14279 | 0 | 0 | 0 | 10 | 0 | 0 | 0 | 0 |
| Z12 (Ref.) | F—Sn | 0 | 0 | 30 | 0 | 0 | 0 | 30 | 0 |
| | 3402 | 0 | 0 | 0 | 0 | 0 | 0 | 0 | 0 |
| | 14251 | 0 | 0 | 0 | 0 | 0 | 0 | 0 | 0 |
| | 14279 | 0 | 0 | 0 | 0 | 0 | 0 | 0 | 0 |

From tables 10a and 10b it can be seen that noninventive compositions without acid HS (Z11) and without acid HS and also without inorganic base BA (Z12), particularly after heat-and-humidity storage, yield significantly poorer results than a comparable inventive composition (Z8). Moreover, the acid-free compositions undergo gelling usually within a few weeks.

TABLE 11a

Comparison of the noninventive Z9 with the inventive adhesion promoter composition Z1 on bonds of different substrates using different adhesives after 3 d RT + 14 d CP and 3 d RT + 21 d CP and using components having undergone different heat aging. The volume mixing ratio of KA to KB for all compositions was 4:1. The temperature figures relate to storage of the component for 7 days at the stated temperature. The substrate in all cases was the tin side of float glass.

| | Storage | | 3 d RT Adhesive | | | | 7 d CP Adhesive | | | |
|---|---|---|---|---|---|---|---|---|---|---|
| Ex. | KA | KB | Move | HMA3 | HMV2 | S265 | Move | HMA3 | HMV2 | S265 |
| Z9 (Ref.) | RT | RT | 95 | 95 | 100 | 100 | 0 | 0 | 0 | 5 |
| | RT | 40° C. | 99 | 99 | 100 | 100 | 0 | 0 | 0 | 20 |
| | RT | 60° C. | 40 | 95 | 95 | 95 | 0 | 0 | 0 | 60 |
| | 40° C. | RT | 20 | 95 | 95 | 100 | 0 | 0 | 0 | 40 |
| | 40° C. | 40° C. | 95 | 95 | 99 | 99 | 0 | 0 | 0 | 40 |
| | 40° C. | 60° C. | 95 | 90 | 95 | 100 | 0 | 0 | 0 | 50 |
| Z1 | RT | RT | 99 | 99 | 99 | 100 | 100 | 100 | 100 | 100 |
| | RT | 40° C. | 70 | 80 | 80 | 99 | 100 | 100 | 100 | 100 |
| | RT | 60° C. | 30 | 95 | 100 | 100 | 90 | 80 | 80 | 100 |
| | 40° C. | RT | 95 | 100 | 100 | 100 | 100 | 90 | 100 | 100 |
| | 40° C. | 40° C. | 95 | 95 | 95 | 100 | 95 | 99 | 99 | 100 |
| | 40° C. | 60° C. | 95 | 99 | 99 | 100 | 95 | 80 | 100 | 100 |

TABLE 11b

Comparison of the noninventive Z9 with the inventive adhesion promoter composition Z1 on bonds of different substrates using different adhesives after 7 d (days) RT and 7 d RT + 7 d CP and using components having undergone different heat aging. The volume mixing ratio of KA to KB for all compositions was 4:1. The temperature figures relate to storage of the component for 7 days at the stated temperature. The substrate in all cases was the tin side of float glass.

| | Storage | | 14 d CP Adhesive | | | | 21 d CP Adhesive | | | |
|---|---|---|---|---|---|---|---|---|---|---|
| Ex. | KA | KB | Move | HMA3 | HMV2 | S265 | Move | HMA3 | HMV2 | S265 |
| Z9 (Ref.) | RT | RT | 0 | 0 | 0 | 5 | 0 | 0 | 0 | 0 |
| | RT | 40° C. | 0 | 0 | 0 | 10 | 0 | 0 | 0 | 5 |

TABLE 11b-continued

Comparison of the noninventive Z9 with the inventive adhesion promoter composition Z1 on bonds of different substrates using different adhesives after 7 d (days) RT and 7 d RT + 7 d CP and using components having undergone different heat aging. The volume mixing ratio of KA to KB for all compositions was 4:1. The temperature figures relate to storage of the component for 7 days at the stated temperature. The substrate in all cases was the tin side of float glass.

| Ex. | Storage KA | KB | 14 d CP Adhesive Move | HMA3 | HMV2 | S265 | 21 d CP Adhesive Move | HMA3 | HMV2 | S265 |
|---|---|---|---|---|---|---|---|---|---|---|
|  | RT | 60° C. | 0 | 0 | 0 | 30 | 0 | 0 | 0 | 20 |
|  | 40° C. | RT | 0 | 0 | 0 | 10 | 0 | 0 | 0 | 0 |
|  | 40° C. | 40° C. | 0 | 0 | 0 | 20 | 0 | 0 | 0 | 5 |
|  | 40° C. | 60° C. | 0 | 0 | 0 | 20 | 0 | 0 | 0 | 5 |
| Z1 | RT | RT | 100 | 100 | 100 | 100 | 95 | 95 | 99 | 99 |
|  | RT | 40° C. | 100 | 100 | 100 | 100 | 90 | 95 | 95 | 95 |
|  | RT | 60° C. | 90 | 90 | 90 | 100 | 70 | 50 | 70 | 99 |
|  | 40° C. | RT | 99 | 95 | 99 | 100 | 80 | 70 | 95 | 99 |
|  | 40° C. | 40° C. | 95 | 99 | 99 | 100 | 80 | 90 | 99 | 99 |
|  | 40° C. | 60° C. | 95 | 99 | 99 | 100 | 80 | 90 | 99 | 99 |

Tables 11a and 11b show adhesion results after heat aging (simulated accelerated aging) of components KA and KB of an inventive (Z1) against a noninventive (Z9) composition. The inventive Z1 exhibits very good adhesion promotion in all combinations of fresh and aged components.

TABLE 12a

Differently aged KA2 of the inventive adhesion promoter composition Z4, tested on bonds of different substrates using different adhesives after 7 d (days) RT and 7 d RT + 7 d CP. The details in the first column describe the aging of the KA2 (13 months RT or 7 d 40° C. plus 13 months RT). KB3 was fresh in each case.

| Storage KA2 | Substrate | 7 d RT Adhesive Move | HMA3 | HMV2 | S265 | 7 d CP Adhesive Move | HMA3 | HMV2 | S265 |
|---|---|---|---|---|---|---|---|---|---|
| 13 m RT | F—Sn | 100 | 100 | 100 | 100 | 100 | 100 | 100 | 100 |
|  | F-air | 100 | 100 | 100 | 100 | 100 | 100 | 100 | 100 |
|  | 3402 | 100 | 100 | 100 | 100 | 100 | 100 | 100 | 100 |
|  | 14251 | 100 | 100 | 100 | 100 | 100 | 100 | 100 | 100 |
|  | 14279 | 100 | 100 | 100 | 100 | 100 | 100 | 100 | 100 |
| 7 d 40° C. + 13 m RT | F—Sn | 100 | 100 | 100 | 100 | 100 | 100 | 100 | 100 |
|  | F-air | 100 | 100 | 100 | 100 | 100 | 100 | 100 | 100 |
|  | 3402 | 100 | 100 | 100 | 100 | 100 | 100 | 100 | 100 |
|  | 14251 | 100 | 100 | 100 | 100 | 100 | 100 | 100 | 100 |
|  | 14279 | 100 | 100 | 100 | 100 | 100 | 90 | 100 | 100 |

TABLE 12b

Differently aged KA2 of the inventive adhesion promoter composition Z4, tested on bonds of different substrates using different adhesives after 7 d RT + 14 d CP and 7 d RT + 21 d CP. The details in the first column describe the aging of the KA2 (13 months RT or 7 d 40° C. plus 13 months RT). KB3 was fresh in each case.

| Storage KA2 | Substrate | 14 d CP Adhesive Move | HMA3 | HMV2 | S265 | 21 d CP Adhesive Move | HMA3 | HMV2 | S265 |
|---|---|---|---|---|---|---|---|---|---|
| 13 M. RT | F—Sn | 100 | 100 | 100 | 100 | 100 | 100 | 100 | 100 |
|  | F-air | 100 | 100 | 100 | 100 | 100 | 100 | 100 | 100 |
|  | 3402 | 100 | 100 | 100 | 100 | 100 | 100 | 100 | 100 |
|  | 14251 | 100 | 100 | 100 | 100 | 100 | 100 | 100 | 50 |
|  | 14279 | 100 | 100 | 100 | 100 | 100 | 100 | 100 | 100 |
| 7 d 40° C. + 13 M. RT | F—Sn | 100 | 100 | 100 | 100 | 100 | 100 | 100 | 100 |
|  | F-air | 100 | 100 | 100 | 100 | 100 | 100 | 100 | 100 |
|  | 3402 | 100 | 100 | 100 | 100 | 100 | 100 | 100 | 100 |
|  | 14251 | 100 | 100 | 100 | 100 | 100 | 100 | 100 | 50 |
|  | 14279 | 100 | 100 | 100 | 100 | 100 | 90 | 100 | 100 |

Tables 12a and 12b show clearly that even storage over 13 months at room temperature, and even additional heat aging of component KA, have virtually no influence on the adhesion results of an inventive composition.

TABLE 13

Test bonds with different flash-off times (1 min to 30 min) and after different storage of the test bond. In all cases the adhesion promoter used was Z4, the substrate used was the tin side of float glass, and the adhesive used was HMA3.

| Storage | 1 min | 2 min | 5 min | 10 min | 15 min | 30 min |
|---|---|---|---|---|---|---|
| 7 d RT | 100 | 100 | 100 | 100 | 100 | 100 |
| 7 d RT + 7 d CP | 100 | 100 | 100 | 100 | 100 | 100 |
| 7 d RT + 14 d CP | 100 | 100 | 100 | 100 | 100 | 100 |
| 7 d RT + 21 d CP | 100 | 100 | 100 | 100 | 100 | 100 |

Table 13 shows adhesion results after different flash-off times, using a fan. Flash-off times of no more than 1 minute, which are extremely short for aqueous compositions, can be readily employed without adversely affecting the adhesion results.

TABLE 14a

Comparison of the inventive Z13 with the noninventive adhesion promoter compositions Z14 on bonds of different substrates using different adhesives after 3 d (days) RT and 3 d RT + 7 d CP.

| | | 7 d RT Adhesive | | | | 7 d CP Adhesive | | | |
|---|---|---|---|---|---|---|---|---|---|
| Ex. | Substrate | Move | HMA3 | HMV2 | S265 | Move | HMA3 | HMV2 | S265 |
| Z13 | F—Sn | 100 | 100 | 100 | 100 | 100 | 100 | 100 | 100 |
| | 3402 | 100 | 100 | 100 | 100 | 100 | 100 | 100 | 100 |
| | 14251 | 100 | 100 | 100 | 100 | 100 | 100 | 100 | 10 |
| | 14279 | 100 | 100 | 100 | 100 | 100 | 95 | 100 | 100 |
| Z14 (Ref.) | F—Sn | 100 | 100 | 100 | 100 | 0 | 10 | 70 | 10 |
| | 3402 | 100 | 100 | 100 | 100 | 0 | 0 | 0 | 50 |
| | 14251 | 100 | 100 | 100 | 100 | 0 | 0 | 0 | 0 |
| | 14279 | 100 | 100 | 100 | 100 | 0 | 0 | 0 | 10 |

TABLE 14b

Comparison of the inventive Z13 with the noninventive adhesion promoter composition Z14 on bonds of different substrates using different adhesives after 7 d RT + 14 d CP and 7 d RT + 21 d CP.

| | | 14 d CP Adhesive | | | | 21 d CP Adhesive | | | |
|---|---|---|---|---|---|---|---|---|---|
| Ex. | Substrate | Move | HMA3 | HMV2 | S265 | Move | HMA3 | HMV2 | S265 |
| Z13 | F—Sn | 100 | 99 | 100 | 10 | 100 | 99 | 100 | 10 |
| | 3402 | 100 | 50 | 100 | 20 | 100 | 20 | 100 | 20 |
| | 14251 | 100 | 80 | 100 | 10 | 99 | 90 | 95 | 10 |
| | 14279 | 100 | 30 | 100 | 30 | 100 | 20 | 100 | 20 |
| Z14 (Ref.) | F—Sn | 0 | 10 | 70 | 0 | 0 | 0 | 50 | 0 |
| | 3402 | 0 | 0 | 10 | 10 | 0 | 0 | 0 | 0 |
| | 14251 | 0 | 0 | 0 | 0 | 0 | 0 | 0 | 0 |
| | 14279 | 0 | 0 | 0 | 10 | 0 | 0 | 0 | 0 |

Tables 14a and 14b show that the inventive composition Z13, consisting of a single component KAB, also exhibits very good adhesion results, whereas the noninventive composition Z14 (without water-soluble carboxylic acid CHS) fails after heat-and-humidity storage. The storage stability of Z14, moreover, was just a few weeks, before it began to gel.

The adhesion results show clearly that the inventive compositions are far superior to the noninventive reference examples in all cases, especially after storage under conditions of heat and humidity. The inventive compositions are storage-stable over long periods and may also be composed of components having different ages, without detriment to the promotion of adhesion.

The invention claimed is:

1. An aqueous adhesion promoter composition, the adhesion promoter composition being formulated as a two-component composition that comprises a first component KA and a second component KB; wherein
   the first component KA is separate from the second component KB;
   the first component KA comprises:
   a) at least one dispersed solid epoxy resin EP,
   b) at least one aminosilane AS,
   c) at least one acid HS, and
   e) water; and
   the second component KB comprises:
   a) at least one amine hardener AH,
   b) at least one inorganic base BA, and
   c) water.

2. The adhesion promoter composition as claimed in claim 1, wherein the acid HS and the inorganic base BA are selected such that when the two components KA and KB are combined, the acid HS and the inorganic base BA together in water form a low-solubility salt.

3. The adhesion promoter composition as claimed in claim 1, wherein the inorganic base BA comprises at least one alkali metal hydroxide and/or alkaline earth metal hydroxide.

4. The adhesion promoter composition as claimed in claim 1, wherein the acid HS comprises one or more acids from the group of $H_3PO_4$, $H_2SO_4$ or water-soluble carboxylic acids CHS.

5. The adhesion promoter composition as claimed in claim 4, wherein the water-soluble carboxylic acid CHS comprises acetic acid.

6. The adhesion promoter composition as claimed in claim 1, wherein the aminosilane AS comprises at least one aminosilane having at least one primary and/or at least one secondary amino group and also having at least one trimethoxysilane group.

7. The adhesion promoter composition as claimed in claim 1, wherein the dispersed solid epoxy resin EP is included with a content of 15 to 35 wt %, based on the overall adhesion promoter composition.

8. The adhesion promoter composition as claimed in claim 1, wherein the amine hardener AH is included with an amine hardener content of 0.5 to 30 wt %, based on the overall adhesion promoter composition.

9. The adhesion promoter composition as claimed in claim 1, wherein
   the first component KA is made of:
   a) 75 to 95 wt % of an aqueous dispersion of at least one solid epoxy resin EP having a solids content of 50 to 60%, based on the aqueous dispersion,
   b) 0.5 to 2 wt % of the at least one aminosilane AS,
   c) 0.5 to 5 wt % of the at least one acid HS, and
   d) sufficient water to make the sum of the weight percentages of the individual constituents a) to d) equal to 100 wt % of the first component KA; and
   the second component KB is made of:
   a) 5 to 35 wt % of an aqueous dispersion of the at least one amine hardener AH, the at least one amine hardener AH having a solids content of 75 to 85%, based on the aqueous dispersion,
   b) 0.5 to 10 wt % of the at least one inorganic base BA;
   c) 0 to 35 wt % of carbon black and/or pigments,
   d) 0 to 0.5 wt % of at least one silane catalyst,
   e) 0 to 2 wt % of at least one wetting agent, and
   f) sufficient water to make the sum of the weight percentages of the individual constituents a) to f) equal to 100 wt % of the second component KB.

10. A method comprising applying a primer for adhesives, sealants or coatings with an adhesion promoter composition as claimed in claim 1.

11. A method for employing an adhesion promoter composition as claimed claim 1, at least comprising the steps of:
    a) mixing components KA and KB by combining the two components, and subsequently stirring and/or shaking the resultant mixture;
    b) applying the mixture of components KA and KB to a surface to be bonded or coated;
    c) flashing off the applied adhesion promoter composition until the water present has undergone at least partial evaporation;
    d) applying an adhesive or sealant to the bonding surface pretreated by steps a) to c).

12. An article bonded or coated, or pretreated for bonding or coating, with the aid of an adhesion promoter composition as claimed in claim 1.

13. An adhesion promoter composition that consists of a single component KAB, the single component KAB being a composition that is made of:
    a) at least one dispersed solid epoxy resin EP;
    b) at least one aminosilane AS;
    c) 0.1 to 5 wt % of at least one acid HS, the at least one acid HS being an acid selected from the group consisting of water-soluble carboxylic acids CHS;
    d) at least one amine hardener AH; and
    e) water.

14. The adhesion promoter composition as claimed in claim 13, wherein the single component KAB consists of:
    a) 35 to 50 wt % of an aqueous dispersion of at least one solid epoxy resin EP having a solids content of 50 to 60%, based on the aqueous dispersion;
    b) 0.25 to 1 wt % of the at least one aminosilane AS;
    c) 0.25 to 2.5 wt % of the at least one acid HS selected from the group consisting of water-soluble carboxylic acids CHS;
    d) 1 to 10 wt % of the at least one amine hardener AH, the at least one amine hardener AH having a solids content of 75 to 85%, based on the aqueous dispersion; and
    e) sufficient water to make the sum of the weight percentages of the individual constituents a) to e) of the single component KAB equal to 100 wt % of the adhesion promoter composition.

* * * * *